(12) United States Patent
Rausio et al.

(10) Patent No.: US 9,291,487 B2
(45) Date of Patent: Mar. 22, 2016

(54) MEASUREMENT ARRANGEMENT AND RELATED METHOD

(75) Inventors: Seppo Rausio, Naantali (FI); Juha Rausio, Raisio (FI)

(73) Assignee: TRENDIWELL OY, Turku (FI)

(*) Notice: Subject to any disclaimer, the term of this patent is extended or adjusted under 35 U.S.C. 154(b) by 62 days.

(21) Appl. No.: 14/390,188

(22) PCT Filed: Apr. 3, 2012

(86) PCT No.: PCT/FI2012/050336
§ 371 (c)(1),
(2), (4) Date: Oct. 2, 2014

(87) PCT Pub. No.: WO2013/150170
PCT Pub. Date: Oct. 10, 2013

(65) Prior Publication Data
US 2015/0059492 A1    Mar. 5, 2015

(51) Int. Cl.
G01F 1/56    (2006.01)
G01F 1/34    (2006.01)
G05B 23/02    (2006.01)

(52) U.S. Cl.
CPC .. G01F 1/56 (2013.01); G01F 1/34 (2013.01); G05B 23/0283 (2013.01)

(58) Field of Classification Search
CPC .......... G01F 1/56; B01D 24/46; B01D 33/82; G08B 21/00
USPC ............. 73/861.08; 340/607; 210/94, 98, 106
See application file for complete search history.

(56) References Cited

U.S. PATENT DOCUMENTS

| 5,036,698 A | 8/1991 | Conti |
| 6,009,404 A * | 12/1999 | Eimer .................. B01D 29/117 210/106 |

(Continued)

FOREIGN PATENT DOCUMENTS

| JP | 2008-047075 | 2/2008 |
| WO | 2009-017851 | 2/2009 |
| WO | 2011-070220 | 6/2011 |

OTHER PUBLICATIONS

International Search Report, dated Jan. 10, 2013, from corresponding PCT application.

(Continued)

*Primary Examiner* — Jewel V Thompson
(74) *Attorney, Agent, or Firm* — Young & Thompson

(57) ABSTRACT

An electronic arrangement for analyzing fluid flow, includes a measuring entity for obtaining indications of power or energy consumption associated with fluid flow relative to a predetermined element, at multiple time instants, during measurement periods, each measurement period occurring between similar subsequent maintenance operations affecting the energy consumption of the element, wherein the measurement indications for the period are utilized for modeling, with reference to the true operating time of the element and excluding non-operating time potentially between active periods, a modeling entity for maintaining a regression model constructed based on indications for measurement periods, the model including a response variable for providing an indication of power or energy consumption during a measurement period and an explanatory variable for representing time, and wherein the model regarding the previous measurement period between the second-last maintenance and the last maintenance is taken as a starting point for the model being currently updated.

16 Claims, 3 Drawing Sheets

(56) References Cited

U.S. PATENT DOCUMENTS

Figure 1:
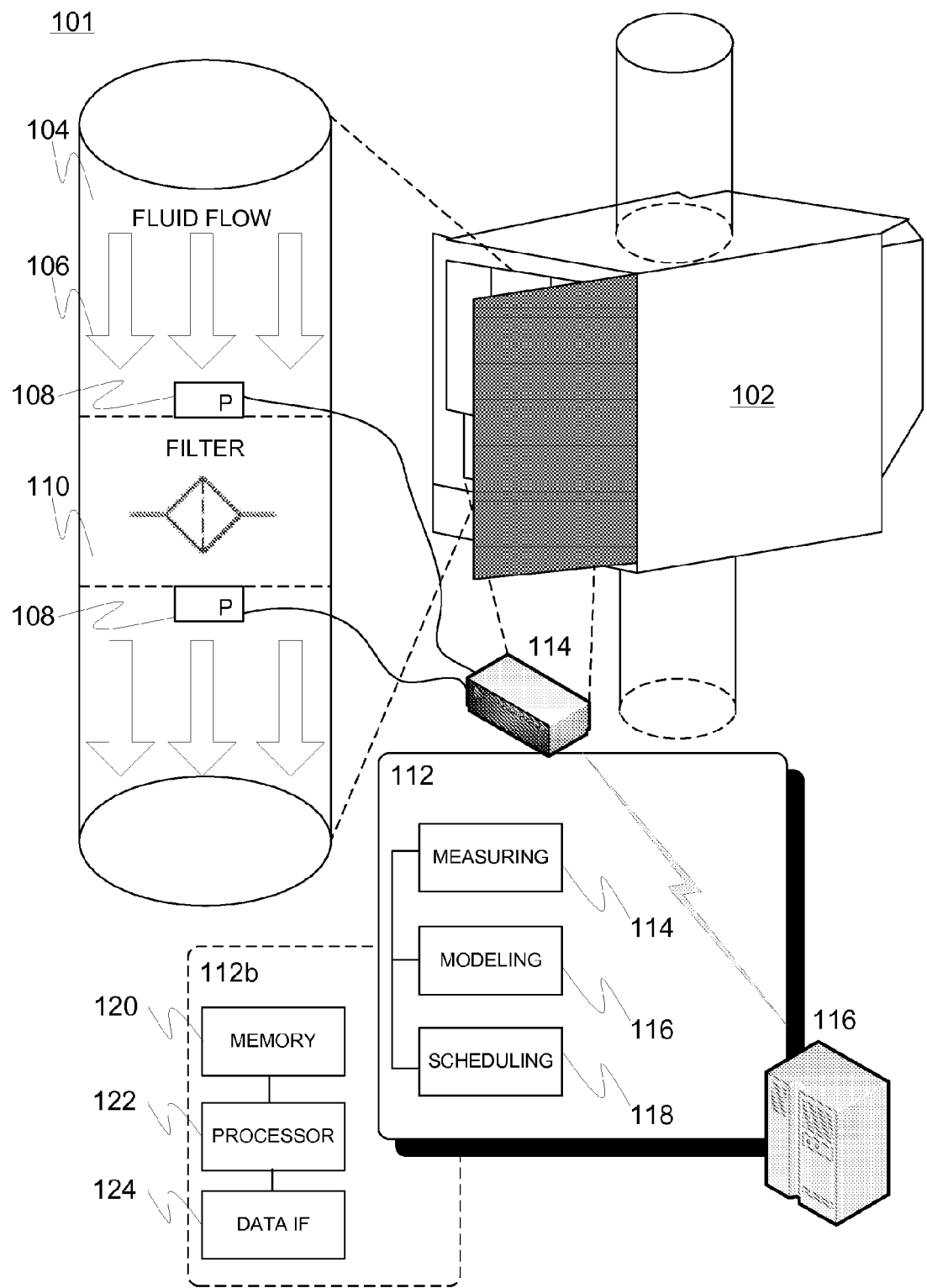

| | | | |
|---|---|---|---|
| 6,334,959 | B1 | 1/2002 | Sutton et al. |
| 6,711,525 | B1 | 3/2004 | Fox et al. |
| 9,074,355 | B2 * | 7/2015 | Jallon .................. C02F 9/005 |
| 9,207,727 | B2 * | 12/2015 | Balogh .................. G06F 1/20 |
| 2004/0078124 | A1 | 4/2004 | Schauble |
| 2005/0247194 | A1 | 11/2005 | Kang et al. |
| 2006/0032245 | A1 | 2/2006 | Kates |
| 2006/0259273 | A1 | 11/2006 | Goldberg |
| 2011/0054811 | A1 | 3/2011 | Contini et al. |

OTHER PUBLICATIONS

FI Office Action, dated Oct. 6, 2015; Application No. 20125377.

* cited by examiner

MEASUREMENT ARRANGEMENT AND RELATED METHOD

FIELD OF THE INVENTION

Generally the present invention relates to automation, measurement and control engineering. In particular, however not exclusively, the present invention pertains to analyzing fluid flow relative to a replaceable or serviceable element, such as a filter, interacting with the fluid.

BACKGROUND

For example, in the fields of research, industry, machinery and estate management, various sensitive elements are often subjected to fluid flow such as liquid or gas flow. Such elements may include filters to filter out impurities from the fluid and e.g. different kinds of sensor devices that bear a measuring probe sensitive to particles or other ingredients or properties of the fluid flow passing by or through the element.

Typically these kinds of elements interacting with the fluid do require replacement or some sort of maintenance, such as cleaning, either regularly or upon specific need.

For instance, in connection with automated ventilation and air-conditioning devices a number of standards and recommendations including various Eurovent recommendations regarding air filters have been produced. They are ought to provide guidelines on measuring and characterizing air filters to enhance or guarantee the associated air quality and facilitate estimating the associated energy consumption, not forgetting the energy costs.

Indeed, theoretical estimate of a filter's energy consumption E based on average pressure loss and constant air flow can be determined as $$E = \frac{Q\overline{P}T}{\eta 1000}(\text{kWh}) \quad (1)$$

wherein Q refers to air flow (m^3/s), $\overline{P}$ refers to average pressure loss (Pa), T refers to operating time (hours) and n refers to the efficiency of the fan. For instance, over one year (8760 h) a 1 mA3/s filter with average pressure loss of 100 Pa requires 1250 kWh when the fan's efficiency is set at 70%.

The performance of the air filters in industrial applications, such as in conjunction with plants, has been mostly estimated relative to the efficiency (separation capability) and pressure loss (pressure drop). In particular, the amount of pressure loss that prevents the fan from maintaining a specific minimum airflow has often been theoretically defined, whereupon filter replacement or cleaning actions have been scheduled to take place accordingly. In particular, filter manufacturers have historically issued recommendations regarding the service interval of their products based on merely guesstimated average use frequency and use conditions thereof, such as simplistic "change the filter every six months" or "change the filter when the pressure drop exceeds 200 Pa".

Nevertheless, as being clear to a skilled person, such recommendations are simply rough reflections, if anything, of real-life use conditions and filter degradation. Further, the aforementioned or other utilized mathematical formulae for assessing energy consumption are extremely coarse and do not correspond to real-time energy consumption of even relatively simple ventilation systems and air filters incorporated therein. As each true filtering scenario is basically unique relating to the filtering objective, environment, gear and/or positioning thereof, available general estimations do not fit any such scenario perfectly. As an outcome, the filters are serviced or changed too often or seldom resulting in unnecessarily high operation costs due to higher than required maintenance costs and/or energy costs, respectively. Notwithstanding the cost type induced, the underlying basic phenomenon, or problem, is then energy consumption that is higher than optimal thanks to over-simplified routines for timing the maintenance tasks including replacing or cleaning the filter.

Generally, environmental responsibility that is obviously related to energy efficiency and thus the overall minimization of energy consumption and e.g. carbon footprint is nowadays a major issue in each field where sustainable development is sought for, i.e. practically all industrial and technical fields. Therefore, the above defects arising from the mostly theoretical standpoint taken in the energy and service management of devices associated with fluid-interacting elements, such as more or less flow-resistive and energy consumption-affecting filters, do need solving without introducing heavy burden to the device manufacturers or users in terms of manufacturing complexity, cost, or use or maintenance complexity.

SUMMARY OF THE INVENTION

The objective is to at least alleviate one or more aforesaid problems and to provide a solution enabling still analytical but also substantially real-life and realtime evaluation of the performance of flow-related elements such as fluid filters and subsequently deriving meaningful control information such as maintenance-related control information, or instructions, therefrom.

In accordance with an aspect of the present invention, an electronic arrangement, such as a device or a system of multiple devices, for analyzing a flow of fluid, such as gas or liquid, comprises a measuring entity configured to obtain indications of the power or energy consumption associated with fluid flow relative to a predetermined element, preferably a filter, at multiple time instants, preferably periodically, during measurement periods, each measurement period occurring between similar subsequent maintenance operations affecting the energy consumption of the element, such as filter cleaning or replacement, wherein the indications for the measurement period are preferably obtained, or at least utilized for modeling, with reference to the true operating time of the element and excluding non-operating time potentially occurring between active periods, a modeling entity configured to maintain a regression model constructed based on the indications for measurement periods, said model comprising a response variable and an explanatory variable, wherein the response variable provides an indication of power or energy consumption during a measurement period and the explanatory variable represents time, preferably said true operating time, and wherein the model regarding the previous measurement period between the second-last maintenance and the last maintenance is taken as a starting point for the model that is updated during the current measurement period since said last maintenance, utilizing the indications obtained during the current measurement period, and a scheduling entity configured to determine an optimized timing for the next maintenance operation utilizing the regression model of the current measurement period and information about the energy cost and maintenance cost.

Preferably the arrangement further comprises an interface for wired or wireless data transfer, such as a wired or wireless transceiver, for communicating data such as gathered sensor data, model data or scheduling information to external entities and optionally for receiving control data from external entities. Further preferably, the arrangement comprises storage such as a number of memory chips for storing the indications, model data and/or scheduling information. Yet, the arrangement may contain a number of sensors and/or be at least functionally connected to them.

In one embodiment, the measuring entity is configured to measure pressure loss associated with the predetermined element to obtain said indications. A pressure sensor may be disposed to each side of the predetermined element so as to derive the pressure loss. Alternatively or additionally, differential pressure sensors may be utilized to directly obtain the associated pressure losses.

In another, either supplementary or alternative, embodiment the measuring entity is configured to measure fluid flow such as volumetric flow rate utilizing e.g. flow rate sensor(s), to obtain said indications. Flow rate data may be converted into volumetric rate data when required and when the flow-related dimensions are known. A number of fluid flow sensors may be utilized for the purpose.

In a further, either supplementary or alternative, embodiment the measuring entity is configured to measure operating voltage and current associated with a device incorporating the predetermined element to obtain said indications. In particular, the fan motor of the device may be monitored. An indication of the efficiency of the fan may be utilized in the subsequent calculations.

In a further, either supplementary or alternative, embodiment the measuring entity is configured to measure air mass utilizing a number of mass airflow sensors (MAFs). The gathered data may be converted into pressure loss information using suitable tables, for example.

Still in a further, either supplementary or alternative, embodiment the regression model is a polynomial model. Optionally, it is substantially a third or fourth order polynomial model.

Yet in a further, either supplementary or alternative, embodiment the scheduling entity is configured to optimize the timing of the maintenance operation in the light of operating costs, i.e. preferably operating cost minimization. The operating costs include energy costs and maintenance costs, optionally expressly so.

In a further, either supplementary or alternative, embodiment the scheduling entity is configured to trigger a maintenance preparatory signal and/or maintenance alarm signal prior to or upon the maintenance instant optimized, respectively. For example, such signal, such as a message (e.g. "maintenance expected in 14 days", "maintenance expected on Jul. 23", or "service now"), may be transmitted towards predetermined recipient(s) such as maintenance personnel.

In a further, either supplementary or alternative, embodiment the scheduling entity is configured to trigger automated maintenance action in accordance with the determined optimized timing. An associated signal such as a message may be transmitted.

In a further, either supplementary or alternative, embodiment the scheduling entity is configured to apply knowledge of predetermined preparation time required for maintenance in order to determine the timing of the maintenance preparatory signal to be triggered.

In a further, either supplementary or alternative, embodiment the scheduling entity is configured to determine, preferably utilizing the model, a preliminary cost gain that corresponds to cost arising from estimated energy consumption during predetermined amount of operation time optionally including operation time required for the preparation of maintenance prior to actual execution thereof at the determined, optimized instant. In some embodiments, the preliminary cost gain may include cost arising from the energy consumption since the last maintenance but prior to beginning the model updating and/or maintenance (and cost) optimization.

However, preparation time may be initially defined in calendar days or other feasible, possibly 'everyday', units often used by the maintenance personnel or the maintenance company, for example, and converted into at least part of said cost gain by the arrangement through utilization of knowledge of the true operating time per calendar day (or per other unit used to initially define the preparation time) and energy consumption (model) relative to true operating time.

In a further, either supplementary or alternative, embodiment the scheduling entity is configured to optimize the time instant of maintenance utilizing the model and criterion according to which energy costs and maintenance costs typically including e.g. maintenance work and optionally material costs, such as the cost of a new filter, are about the same. The time span for assessing costs may be determined in different ways depending on the embodiment. For instance, costs since the last maintenance and/or beginning of the measurement period may be monitored and estimated. In some embodiments, particularly the energy cost (share) arising from the degradation or contamination of the predetermined element such as a filter may be monitored and estimated for comparison e.g. with the maintenance costs. Basic level (minimum level) energy costs arising from the function of a clean/new element are thus not necessarily taken into account.

In a further, either supplementary or alternative, embodiment a maximum allowable pressure loss is determined relative to the predetermined element such as a filter. Such parameter is subsequently monitored and the maintenance is instructed upon reaching the maximum loss optionally despite of the other criteria for optimizing the timing of the maintenance.

In a further, either supplementary or alternative, embodiment a threshold pressure loss increase and/or operation time passed is determined for triggering model updating (and related calculations) following a maintenance action such as filter change.

In a further, either supplementary or alternative, embodiment data acquisition from sensors such as pressure, air flow or voltage/current sensors is executed utilizing a certain sampling frequency, which differs from the time resolution applied in data storing, modeling and/or scheduling. Alternatively or additionally, storing, modeling and/or scheduling may mutually apply different time resolution. For instance, data acquisition may utilize the highest sampling frequency (or longest integration time), whereas storing and/or modeling may apply a coarser resolution, wherein data samples measured are aggregated by averaging, for instance, relative to time. E.g. a sliding window method may be utilized for determining the desired parameters such as average pressure loss (e.g. utilizing a window of predetermined length, such as (the last) seven days, and determining the value then once per predetermined time unit like a day, wherein each day-based value may itself be an averaged one, for instance).

In a further, either supplementary or alternative, embodiment the predetermined element is or comprises a filter or a radiator.

In a further embodiment a measurement module comprises the electronic arrangement in accordance with the present invention.

In a further embodiment a ventilation device or a system comprises the electronic arrangement in accordance with the present invention.

In a further embodiment, a measurement system comprises at least one, optionally multiple, measurement devices including said measuring entity and a functionally connected server entity comprising said modeling and optionally scheduling entities. The server entity may refer to one or more functionally connected server devices or e.g. a cloud computing system.

In another aspect, a method for analyzing a flow of fluid, such as gas or liquid, comprises obtaining indications of the power or energy consumption associated with fluid flow relative to a predetermined element, preferably a filter, at multiple time instants, preferably periodically, during measurement periods, each measurement period occurring between similar subsequent maintenance operations affecting the energy consumption of the element, such as filter cleaning or replacement, wherein the indications for the measurement period are preferably obtained, or at least utilized for modeling, with reference to the true operating time of the element and excluding non-operating time potentially between active periods, maintaining a regression model constructed based on the indications for measurement periods, said model comprising a response variable and an explanatory variable, wherein the response variable provides an indication of power or energy consumption during a measurement period and the explanatory variable represents time, preferably said true operating time, and wherein the model regarding the previous measurement period between the second-last maintenance and the last maintenance is taken as a starting point for the model that is updated during the current measurement period since said last maintenance utilizing the indications obtained during the current measurement period, and determining the timing for next maintenance operation utilizing the regression model of the current measurement period and information about the energy cost and maintenance cost.

The previously presented considerations concerning the various embodiments of the arrangement may be flexibly applied to the embodiments of the method mutatis mutandis and vice versa, as being appreciated by a skilled person.

The utility of the present invention arises from a plurality of different issues depending on the embodiment. Instead of vague general charts or theoretical contemplations, each use scenario of a predetermined element interacting with fluid flow, such as a filter, may be monitored and modeled based on real conditions substantially in real-time fashion. As a result, pressure loss, power consumption and/or energy consumption models may be accurately determined either on the spot or by remote entities. A number of various derivative or related parameters such as carbon footprint may be calculated and reported by the arrangement. Desired reports may be generated for property management and other parties.

In particular, the timing of the maintenance operations such as air filter changes may be optimized relative to realistic energy and maintenance costs but still further adapting to other technical restraints such as absolute requirements regarding maximum allowable pressure loss in conjunction with a filter and/or the maximum allowable life span of a filter.

Further, the used algorithms are robust and simple enough to be implemented via ordinary hardware such as sensor and processing hardware, which lowers the manufacturing costs and thus the retail price of the arrangement. Nevertheless, the reliability of the measurements, modeling and scheduling remains high. The arrangement may be small-sized and it consumes very little energy. It is easy to install at both new and existing use locations as an add-on module or a separate device or system relative to target device such as a ventilation device. Full integration is possible as well. The arrangement is basically maintenance-free. Remote control and monitoring of the utilized components is possible. Automated triggering of maintenance tasks or alerts may be duly performed.

The expression "a number of" refers herein to any positive integer starting from one (1), e.g. to one, two, or three.

The expression "a plurality of" refers herein to any positive integer starting from two (2), e.g. to two, three, or four.

The term "element" may herein refer also to a multi-part element with multiple functionally and optionally also physically connected elements in addition to single-part or integrated elements.

The terms "a" and "an", as used herein, are defined as one or more than one.

Different embodiments of the present invention are disclosed in the dependent claims.

BRIEF DESCRIPTION OF THE RELATED DRAWINGS

Next the invention is described in more detail with reference to the appended drawings in which FIG. 1 illustrates one embodiment of the present invention for analyzing a flow of fluid from the standpoint of power and energy consumption associated with predetermined element the performance of which degrades over time.

Figure 2:
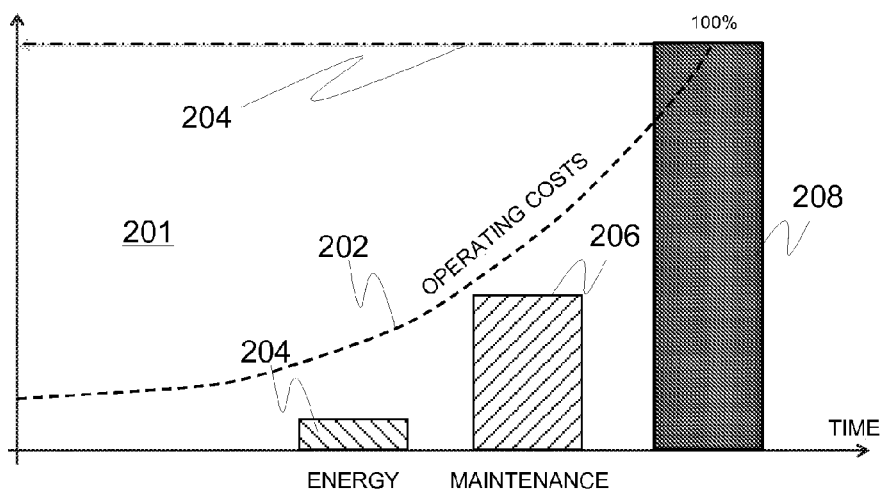
Figure 3:
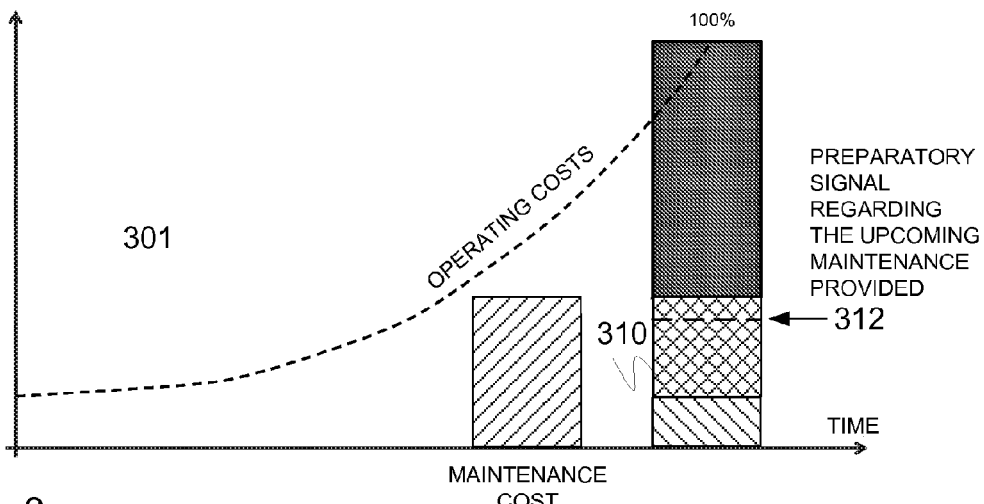
Figure 4:
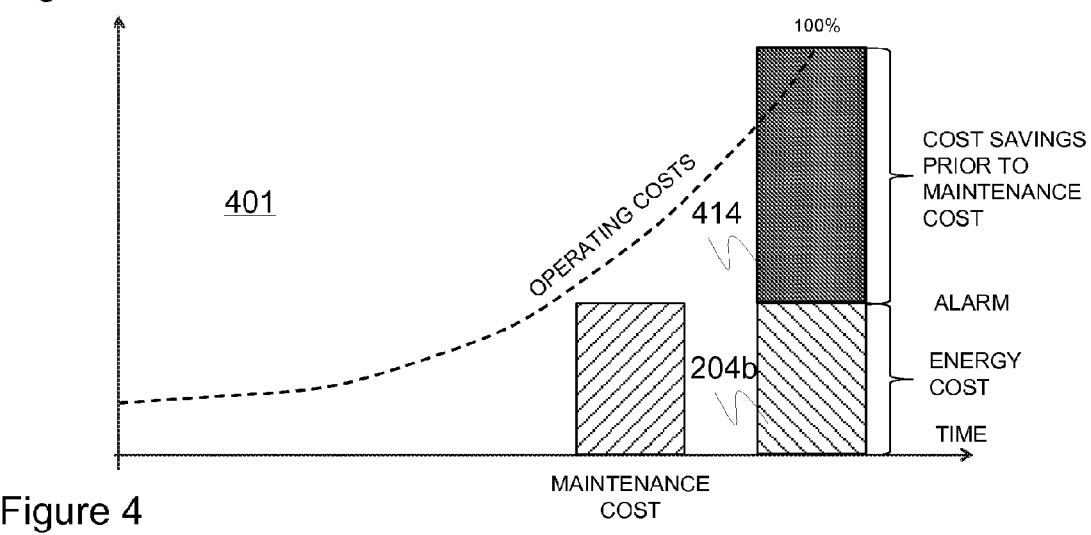

FIGS. 2-4 visualize different concepts and benefits of the embodiments of the present invention graphically.

Figure 5:
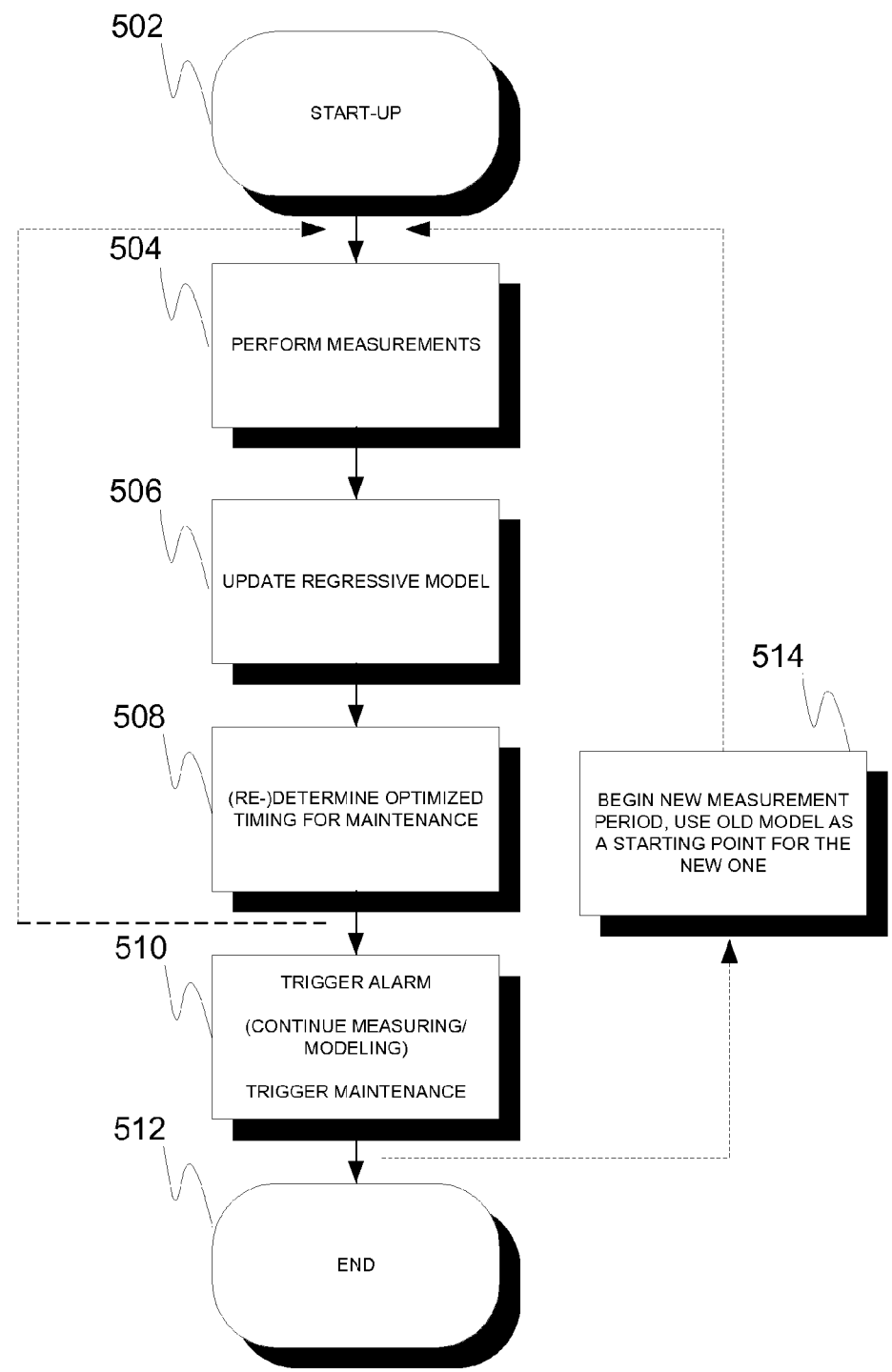

FIG. 5 is a flow diagram representing one embodiment of a method in accordance with the present invention.

DETAILED DESCRIPTION

FIG. 1 illustrates, by way of example only, one use scenario 101 wherein a ventilation system or device 102 contains a filter 110 subjected to air flow 106 in a conduit 104.

The performance of the filter 110 degrades over time as the flow may slowly break or weaken the structure such as the fibrous structure thereof and in particular, the filter 110 collects impurities from the flow, which eventually begins to inhibit the flow and increase the related pressure loss and energy cost due to the often necessary, but more power and energy consuming, compensation measures such as fan rotation speed increments to sustain the flow. Thus e.g. the pressure loss caused by the filter 110 may be utilized as an indication of the associated power and energy consumption, and applied in the analysis as set forth herein.

The device 102 is provided with internal or external electronic arrangement 112 in accordance with the present invention. The arrangement 112 may include a local stand-alone device or add-on module 114, and optionally remote element(s) such as server computer 116 functionally connected, over a communications connection, to the on-spot gear 114.

The arrangement 112 is provided with integrated or at least functionally, wirelessly or wiredly, connected sensors 108 such as pressure sensors (shown). Via the pressure difference signal, the increasing pressure loss may be determined for the filter 110 in relation to time, and the related energy costs, notably also the progressively increasing portion in the energy costs due to filter contamination, be monitored and predicted for the future instants.

The arrangement 112 comprises measuring 114, modeling 116 and scheduling 118 entities, by which is herein referred to at least logical entities. The physical realizations may be different and combined with other entities and/or split into further entities.

Block 112b indeed illustrates few potential elements of the arrangement 112 in the light of the utilized hardware. For example, a number of memory chips 120, processors 122 (microprocessor, microcontroller, programmable logic, ASICs, etc.) and communication/I/O means 124 such as a wired or wireless transmitter, a transceiver, or a receiver may be provided. E.g. selected Ethernet, WLAN or cellular network standards could be followed by the communication means 124 instead of or in addition to selected standards for industrial communication. Such communication means 124 may be utilized for communication with local devices such as ventilation devices 102 and/or remote devices such as remote server devices 116 or terminal devices (e.g. mobile terminal operated by service personnel).

Reverting to the connection between logical and physical elements of the arrangement, e.g. the sensing functions 114 may be implemented utilizing sensor data acquired using a number of integrated or at least functionally connected (e.g. via interface 124) sensors 108, processor 122 for processing the sensor data and/or controlling the acquisition thereof according to predetermined rules (software logic), and memory 120 for storing the data and the rules.

Similarly, modeling 116 or scheduling 118 could be realized through cooperation between memory 120 storing the algorithms and other logic as well as data, and processor 122 actually executing the algorithms and establishing the model or determining optimum maintenance instants based on the model and other available data.

A skilled person shall understand the arrangement may comprise many other features and elements not explicitly shown in the figure. E.g. a display, a GPS (Global Positioning System) receiver or other positioning device, or e.g. a memory card/card slot could be included therein.

The regression model constructed and updated may be a polynomial regression model such as third or fourth order polynomial model. For instance, polynomial function $$f(x)=y=ax^3-bx^2+cx+d \qquad (2)$$

wherein explanatory variable x refers to time, such as operation time, and y refers to pressure loss or other measured or measurement data-derived, such as averaged, dependent variable such as power consumption or energy consumption, could be exploited. a, b, c represent regression coefficients and d could be considered as error term (potentially zero). The model may be finished, i.e. coefficients determined and updated, based on the available, stored measurement data such as pressure difference values relative to time. With the model it is clear that also predictive values for y may be rather cleverly obtained by placing future-indicating values of explanatory variable x in the model. The model may be also represented graphically on a display of the arrangement or of some suitable remote device as a curve for illustrative purposes, etc.

FIGS. 2-4 visualize few principles and aspects of the analysis logic considered in connection with present invention. Similar elements are marked with the same fill pattern in all of the figures.

Operating costs curve 202 (horizontal axis represents time, whereas vertical axis corresponds to cost) is substantially exponential by nature, which often matches with the reality rather well as in many applications when e.g. the filter or other predetermined, flow-subjected, element degrades over time and the extra energy-requiring compensation measures such as fan speed increase are needed, the necessary tasks consumer more and more power, energy and ultimately money due to increasing energy costs. In any case, a degraded element such as a contaminated filter causes severe losses to the fluid circulation system.

The curve 202 may be established utilizing the modeling techniques, preferably regression, explained herein. Line 204 represents the operating costs associated with traditional service routines following fixed schedules (e.g. once in a year, when the pressure loss is 200 Pa, etc.) thus defining 100% level, or 'top level', for the costs relative to which cost savings may be sought after.

Energy cost bar 204 represents the dynamic energy costs that increase, often exponentially, throughout the measurement period between the maintenance operations.

Maintenance cost bar 206 represents the typically fixed maintenance costs known to be realized upon each maintenance operation such as filter cleaning or replacement.

Preliminary cost gain 310 represents a concept, or a parameter, that reflects cost arising from estimated energy consumption during a predetermined amount of operation time.

Line 312 indicates the start of the preparation period and thus the instant for triggering the maintenance preparatory signal indicative of the forthcoming, estimated optimum maintenance instant. The preliminary cost gain may be considered to turn into energy cost when the optimum maintenance instant approaches.

In FIG. 4, the preliminary cost gain 310 has turned into energy cost that now matches with the maintenance cost, and the preparation time (period) for the maintenance has been consumed. The maintenance operation is to be executed immediately. Alarm signal for triggering the maintenance asap may be provided.

The estimated operating cost savings provided by the reduced energy costs (savings shown in the figure as the upper portion 414 of the rightmost bar) are then reduced by the maintenance costs 206, and the overall operating cost savings (cost shown in FIG. 2 by bar 208 reduced by the effectuated energy cost 204b and maintenance cost 206) are obtained as a result.

FIG. 5 is a flow diagram of an embodiment of a method in accordance with the present invention. At method start-up 502, the necessary gear such as the arrangement, (external) sensors, etc. are obtained through acquisition of third party components and/or based on in-house manufacturing, for example. The applicable software may be created and tailored, i.e. suitable control parameters such as the desired preparation time for the maintenance may be defined. Likewise, energy cost (e.g. price per kWh) and maintenance cost (e.g. exact amount per maintenance round) information may be inputted.

At 504, the measurements utilized in modeling the power consumption relating to the monitored predetermined element are executed. E.g. differential pressure relative to a filter may be periodically monitored and time-pressure value series stored for modeling.

The measurements may be gathered only relative to active periods (i.e. true operating time) of the device associated with the predetermined element such as filter. Alternatively, the measurements may be at least temporally scaled for modeling, for instance, relative to the true operating time e.g. on a weekly basis such that after one week of absolute measuring time the inspected parameters such as indications of power loss, power consumption or energy consumption are determined and stored relative to the (true) operating time within the week, or other used reference period.

Responsive to the data acquisition, the regressive model is established or updated (old model relative to previous measurement period between the second last and last maintenance as explained herein earlier), which takes place at 506. The model is preferably constructed relative to the true operating time of the monitored system or device such as ventilation device and predetermined element like filter associated with the device.

In some embodiments, the model update procedure is not started until a number of conditions are met, e.g. predetermined duration of true operation time passed since the last maintenance and/or pressure loss increased a predetermined amount as mentioned hereinbefore.

For instance, such time-related triggering condition for the modeling and e.g. estimation of costs/cost savings may be utilized in those, rather numerous, scenarios wherein it is known that regarding a period right after a maintenance operation the additional energy consumption associated with the degradation of the new or at least serviced filter by the flow-disturbing captured particles is very small, and thus the beginning the modeling may be postponed as unnecessary. In some scenarios, such time period may be specified as e.g. one or several weeks of (true) operation time.

Accordingly, the optimum time instant for the maintenance is determined at 508 utilizing the model, energy cost information, maintenance cost information, and a number of related, desired decision-making criteria. The instant may be determined and/or indicated using a desired resolution such as hour, day, or week resolution.

At 510, the maintenance is triggered or, when applicable, alarm for the start of the preparation period is given (measuring/modeling may still be continued).

At 514, the service is executed, new measurement/energy cost period is started and the existing model prepared as a starting point for the model of the next period. In practical circumstances it may turn out that the model does not have to be updated, either at all or at least considerably, during subsequent maintenance periods, if the use scenario including e.g. ventilation objectives and environmental conditions remains intact, whereupon modeled parameters (values) such as regression coefficients do not substantially change or potential triggering condition(s) for updating are not met.

Method execution is ended at 512.

As being clear to a skilled person and indicated by the dotted loop-back arrows in the figure, the method embeds many repetitive items the instances of which may be executed alternately, such as acquisition of new measurement data at 504 followed by model update at 506 in response to new data, finally followed by a scheduling update resulting from new model, after which the loop restarts in response to new measurement data obtained.

A skilled person may also on the basis of this disclosure and general knowledge apply the provided teachings in order to implement the scope of the present invention as defined by the appended claims in each particular use case with necessary modifications, deletions, and additions.

For example, if the monitored power/energy consumption associated with the predetermined element drops down due to stoppage or some other reason after the maintenance preparatory signal has been sent but prior to the optimized maintenance instant, the arrangement is configured to postpone triggering the actual maintenance or sending the maintenance alarm signal until the planned level of power/energy consumption for executing the maintenance is reached.

Yet, in some embodiments, the device or system associated with the predetermined element, such as a filter, may contain a means such a clip or a loading device for accommodating a plurality of such elements wherefrom a new/serviced element may be transferred to replace the element to be serviced upon the optimized maintenance instant preferably automatically. The device or system may also contain a collector for the already-used elements.

In some embodiments, the predetermined element such as a filter may be integrated with a number of sensors such as (differential) pressure sensor(s).

In some embodiments, the optimized maintenance instant is also utilized to trigger a number of supplementary maintenance actions, such as basic service of the device or system hosting the predetermined element and/or connected or nearby entities in the favor of overall maintenance efficiency, for instance.

In some embodiments, sudden, long-lasting and/or severe drop (according to predetermined monitoring logic, e.g. threshold-based monitoring) of the monitored pressure loss, i.e. reduced pressure loss, may trigger an alarm such as sending an alarm signal. The situation may occur when the predetermined element such as a filter breaks down, or gets loose, and lets the fluid flow through substantially freely, for example.

The invention claimed is:

1. An electronic arrangement (101, 112, 114, 116), such as a device or a system of multiple devices, for analyzing a flow (106) of fluid, such as gas or liquid, through a predetermined filter element comprising:
   a measuring entity (114, 120, 122) configured to obtain indications of the power or energy consumption associated with fluid flow relative to the predetermined filter element at multiple time instants, preferably periodically, during measurement periods, each measurement period occurring between similar subsequent maintenance operations affecting the energy consumption of the filter element, such as cleaning or replacement, wherein the indications for the measurement period are preferably obtained, or at least utilized for modeling, with reference only to the active periods provided as the true operating time of the element and excluding non-operating time potentially occurring between active periods,
   a modeling entity (116, 120, 122) configured to maintain a regression model constructed based on the indications for measurement periods, said model comprising a response variable and an explanatory variable, wherein the response variable provides an indication of power or energy consumption during a measurement period and the explanatory variable represents said true operating time, and wherein the model regarding the previous measurement period between the second-last maintenance and the last maintenance is taken as a starting point for the model that is updated during the current measurement period since said last maintenance utilizing the indications obtained during the current measurement period, and
   a scheduling entity (118, 120, 122) configured to determine an optimized timing for the next maintenance operation utilizing the regression model of the current measurement period and information about energy cost and maintenance cost.

2. The arrangement of claim 1, wherein the measuring entity is configured to measure pressure loss (108) associated with the predetermined element, preferably utilizing a number of pressure sensors or a differential pressure sensor, to obtain said indications.

3. The arrangement of claim 1, wherein the measuring entity is configured to measure fluid flow such as volumetric flow rate preferably utilizing a number of flow rate sensors to obtain said indications.

4. The arrangement of claim 1, wherein the measuring entity is configured to measure operating voltage and/or current associated with a device incorporating the predetermined element to obtain said indications, preferably the fan or fan motor of the device.

5. The arrangement of claim 1, wherein the measuring entity is configured to measure air mass relative to the predetermined element utilizing a number of mass airflow sensors, said air mass data being subsequently converted into pressure loss information to obtain said indications.

6. The arrangement of claim 1, wherein the regression model is a polynomial model, optionally being substantially third or fourth order polynomial model.

7. The arrangement of claim 1, configured to obtain indications and/or begin updating the model during a measurement period provided that at least one predetermined condition has been fulfilled.

8. The arrangement of claim 7, wherein the condition dictates the pressure loss associated with the predetermined element being great enough relative to the initial pressure loss after maintenance.

9. The arrangement of claim 7, wherein the condition dictates the true operating time passed since maintenance.

10. The arrangement of claim 1, wherein the optimized timing for the maintenance is determined based on estimating a predetermined absolute or weighted balance between the known maintenance cost and energy cost determined utilizing the model, wherein the optimized maintenance instant is optionally the instant when the maintenance cost and the energy cost absolutely, or in a weighted manner, substantially match each other.

11. The arrangement of claim 1, configured to provide a preparatory maintenance signal upon reaching the instant preceding the estimated optimal maintenance instant by predetermined duration.

12. The arrangement of claim 1, configured to provide a maintenance alarm signal instructing to execute the maintenance, said alarm signal being provided upon reaching the estimated optimal time instant for maintenance.

13. The arrangement of claim 1, configured to trigger executing, and optionally executing, the maintenance upon reaching the estimated optimal time instant for maintenance.

14. The arrangement of claim 1, configured to trigger an alarm such as sending an alarm signal upon detecting a drop of the monitored pressure loss associated with the predetermined element during a measurement period.

15. A method for analyzing a flow of fluid, such as gas or liquid, through a predetermined filter element comprising:
obtaining indications (504) of the power or energy consumption associated with fluid flow relative to the predetermined filter element at multiple time instants, preferably periodically, during measurement periods, each measurement period occurring between similar subsequent maintenance operations affecting the energy consumption of the filter element, such as cleaning or replacement, wherein the indications for the measurement period are preferably obtained, or at least utilized for modeling, with reference only to the active periods provided as the true operating time of the element and excluding non-operating time potentially occurring between active periods,
maintaining a regression model (506, 514) constructed based on the indications for measurement periods, said model comprising a response variable and an explanatory variable, wherein the response variable provides an indication of power or energy consumption during a measurement period and the explanatory variable represents said true operating time, and wherein the model regarding the previous measurement period between the second-last maintenance and the last maintenance is taken as a starting point for the model that is updated during the current measurement period since said last maintenance utilizing the indications obtained during the current measurement period, and
determining the timing (508, 510) for next maintenance operation utilizing the regression model of the current measurement period and information about the energy cost and maintenance cost.

16. The arrangement of claim 8, wherein the condition dictates the true operating time passed since maintenance.

* * * * *